(12) United States Patent
Chen

(10) Patent No.: US 8,572,128 B2
(45) Date of Patent: Oct. 29, 2013

(54) METHOD OF MANAGEMENT FOR MAP-TYPE TOUR INFORMATION

(75) Inventor: Jiun-Ren Chen, Taipei County (TW)

(73) Assignee: Lemon Info.Tech.Co.Ltd., Taipei (TW)

( * ) Notice: Subject to any disclaimer, the term of this patent is extended or adjusted under 35 U.S.C. 154(b) by 1060 days.

(21) Appl. No.: 12/126,026

(22) Filed: May 23, 2008

(65) Prior Publication Data

US 2008/0294662 A1 Nov. 27, 2008

(30) Foreign Application Priority Data

May 24, 2007 (TW) ................................ 96118548 A

(51) Int. Cl.
*G06F 17/30* (2006.01)
*G06F 7/00* (2006.01)

(52) U.S. Cl.
USPC ........................... 707/798; 707/758; 707/802

(58) Field of Classification Search
USPC .................................................. 707/798, 758
See application file for complete search history.

(56) References Cited

U.S. PATENT DOCUMENTS

| 7,260,474 | B1 * | 8/2007 | Thayathil et al. | 701/428 |
| 2003/0176986 | A1 * | 9/2003 | Dietsch et al. | 702/150 |
| 2005/0093720 | A1 * | 5/2005 | Yamane et al. | 340/995.13 |
| 2005/0149260 | A1 * | 7/2005 | Bae | 701/209 |
| 2006/0174211 | A1 * | 8/2006 | Hoellerer et al. | 715/782 |
| 2007/0124066 | A1 * | 5/2007 | Kikuchi et al. | 701/209 |

* cited by examiner

*Primary Examiner* — Kuen Lu
(74) *Attorney, Agent, or Firm* — Ming Chow; Sinorica, LLC

(57) ABSTRACT

A method of managing map-type tour information, which allows a travel-lover to record each trip. A plurality of scenic spots passed through in the trip is labeled on a map. By linking the plurality of scenic spots, a tour route is formed and shown clearly on the map. Set a link to each of the scenic spots, click the link to each of the scenic spot, and input the introduction, related web addresses, and appraisals to the scenic spots.

10 Claims, 6 Drawing Sheets

METHOD OF MANAGEMENT FOR MAP-TYPE TOUR INFORMATION

FIELD OF THE INVENTION

The present invention relates generally to a method of management for tour information, and particularly to a method of management for map-type tour information.

BACKGROUND OF THE INVENTION

Because of two days off per week, people like to travel with their families increasingly. Besides, there exist many travel-lovers or tour professionals. After each travel, some people will file their multiple pictures taken in the trip on websites or composing travel notes in personal blogs. However, when reviewing those pictures and travel notes after a period of time, people may forget some processes of the tour.

Currently, although larger websites, such as Yahoo, provide forums for browsers to discuss scenic spots thereon, tour information is not complete. Because it is not possible to visit only a single scenic spot in a trip, without complete information of travel routes, a decent tour course cannot be planned. In addition, on the websites of tourism agents, only the names of locations are labeled, without marking relative locations. It takes travels' time to search information by themselves, which turns out to be time-consuming and the searched information may be incorrect.

Accordingly, the present invention provides a method of management for tour information, which can record complete tour routes and show clearly on a map. Thereby, it is convenient for a traveler to plan his tour course.

SUMMARY

An objective of the present invention is to provide a method of management for map-type tour information. By using a plurality of scenic spots and a plurality of shops passed through in each trip and labeled on a map, and by clicking a plurality of links corresponding to the plurality of scenic spots and shops, the distinguishing features of the plurality of scenic spots and shops and be recorded. Thereby, tour professionals or travel-lovers can record the process of each trip, which is helpful for the planning of the next tour route.

Another objective of the present invention is to provide a method of management for map-type our information, which can be applied in websites and thereby browsers of the websites and the tourism agents can refer to the tour routes recorded thereon for planning a perfect tour in the future. Besides, the tour routes can also record the plurality of shops, and the operators of the plurality of shops can advertise and promote on the websites.

In order to achieve the objectives described above, the method of management for map-type tour information comprises selecting a plurality of scenic spots, labeling on a map, forming a tour route, setting a link to each of the scenic spots, clicking the link to each of the scenic spots, and inputting related information of each of the scenic spots.

In the description above, the plurality of scenic spots passed though in the tour route is recorded. Furthermore, a plurality of shops passed though in the tour route can be recorded as well. The method thereby further comprises selecting a plurality of shops passed through in the tour route, setting a link to each of the shops, clicking the link to each of the scenic spots, and inputting related information of each of the shops.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
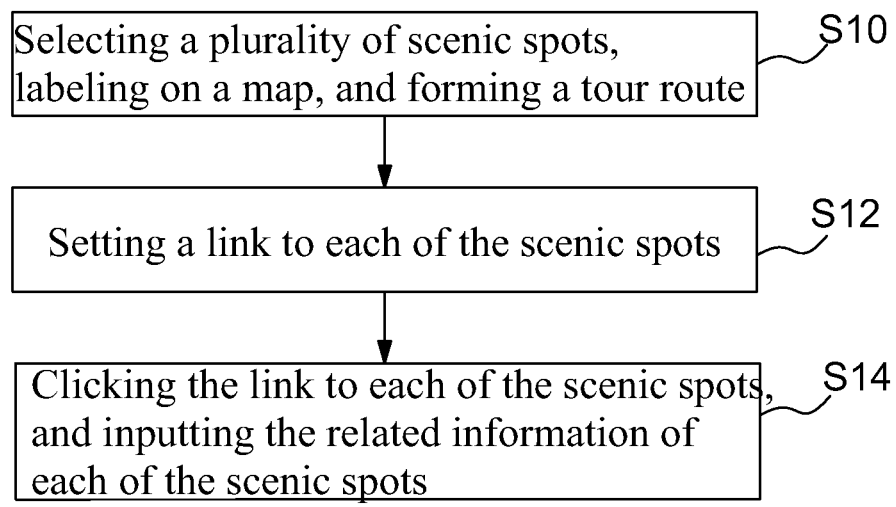
FIG. 1 shows a flowchart according to a preferred embodiment of the present invention.

FIG. 1 shows a flowchart according to a preferred embodiment of the present invention. As shown in the figure, the present invention provides a method of management for map-type tour information, which can be applied in travel websites. First, the step S10 is executed for selecting a plurality of scenic spots, labeling on a map, and forming a tour route. The method of selecting the plurality of scenic spots includes inputting a name of location, a longitude and latitude, or an address corresponding to each of the scenic spots. Alternatively, selecting directly on the map is possible. Then the step S12 is executed for setting a link to each of the scenic spots. Next, the step S14 is executed for clicking the link to each of the scenic spots, and inputting the related information of each of the scenic spots, which includes introduction, related web addresses, video, recording, pictures, or appraisals corresponding to the scenic spot.

Figure 2:
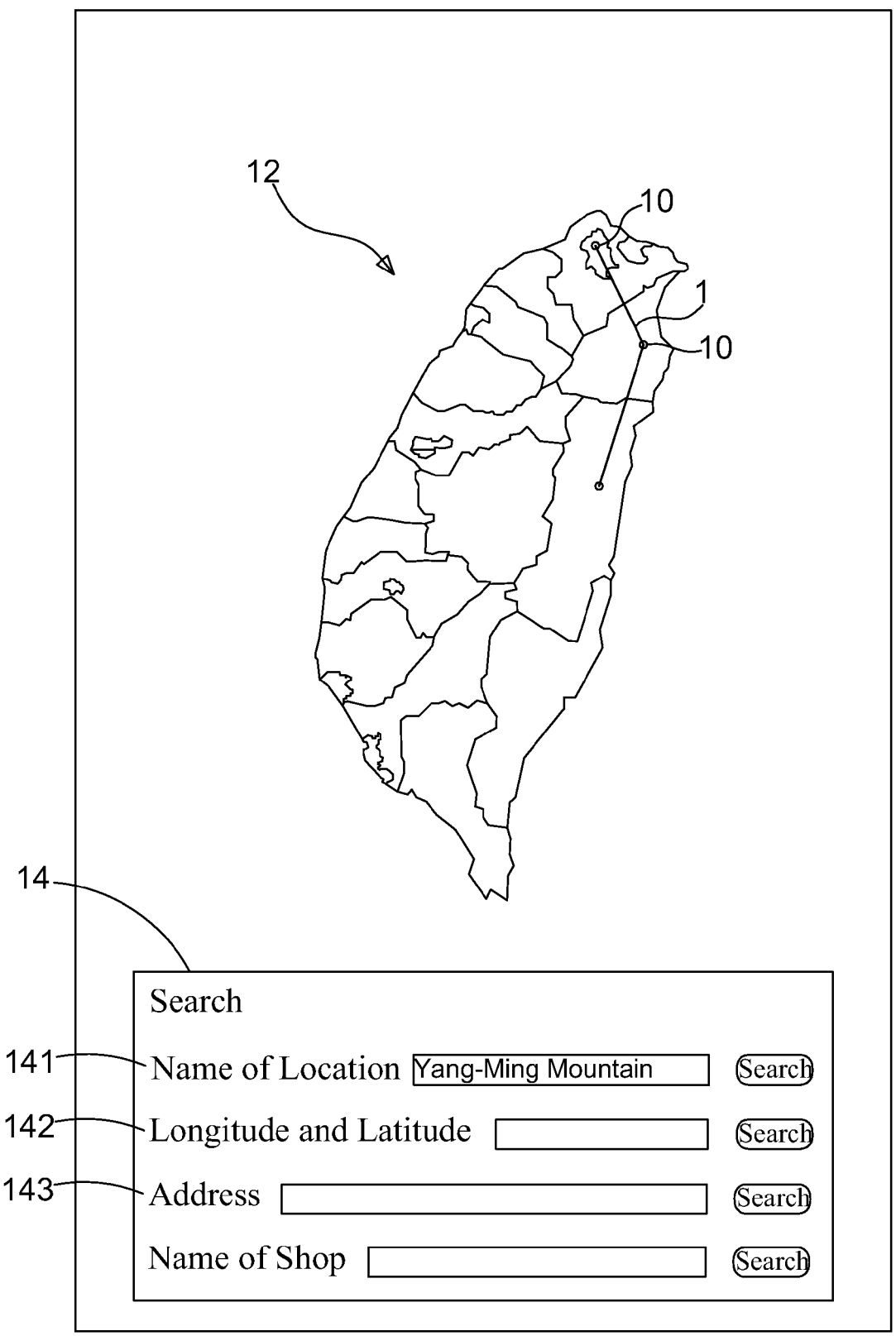
FIG. 2 shows a display schematic diagram of a webpage of a website according to a preferred embodiment of the present invention.

FIG. 2 shows a display schematic diagram of a webpage of a website according to a preferred embodiment of the present invention. As shown in the figure, the website owner label a plurality of scenic spots of each tour route, according to his own traveling experiences, on a map 12 of the webpage. For example, the plurality of scenic spots 10 of the tour route 1, from north to south sequentially, includes the Yang-Ming Mountain of Taipei, the Dong-Shan River of I-Lan, and the Ocean Park of Hua-Lien. The search window 14 on the webpage can be filled with a plurality of names of location 141, longitude and latitude 142, or addresses 143 corresponding to the plurality of scenic spots 10, and the scenic spot 10 can be searched and labeled on the map 12. Alternatively, the plurality of scenic spots 10 can be selected directly on the map 12 of the webpage. Thereby, the browser of the website can refer to the tour route 1 provided by the website owner.

Figure 3:
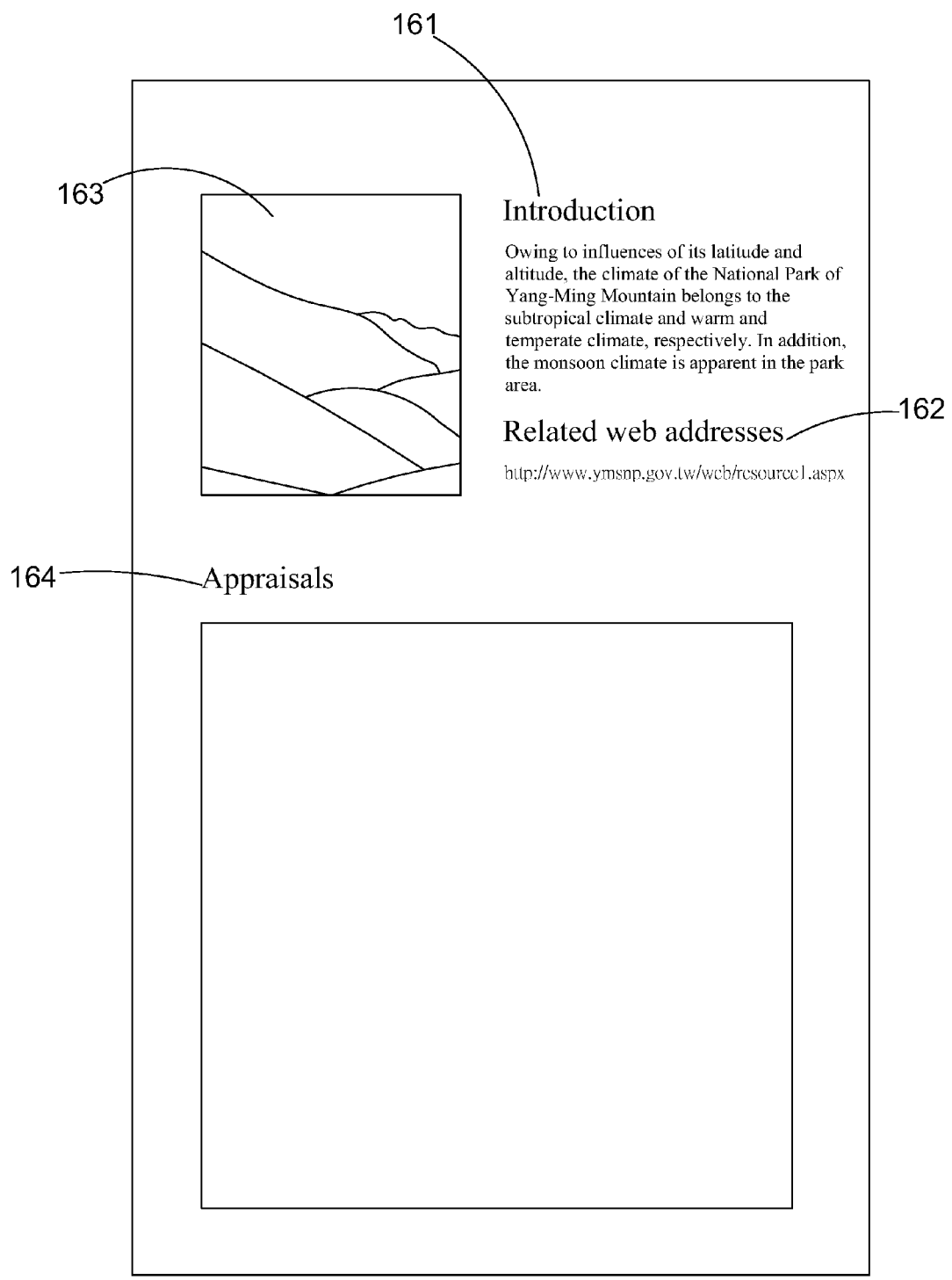
FIG. 3 shows a display schematic diagram of another webpage of a website according to a preferred embodiment of the present invention.

FIG. 3 shows a display schematic diagram of another webpage of a website according to a preferred embodiment of the present invention. As shown in the figure, a link is set to each of the plurality of scenic spots, respectively, in every tour route 1 described above. The website owner clicks the link to each scenic spot and opens another webpage. Then the introduction 161, related web addresses 162, and travel pictures 163 can be inputted. In addition, appraisals 164 to the scenic spot 10 can be performed. The browsers of the website can refer to the appraisals 164 for planning tours of their own. They can further provide their appraisals 164 to the scenic spot with prior identify approval by the website. For example, by clicking the link to the scenic spot Yang-Ming Mountain, the introduction 161, the related web addresses 162, the travel pictures 163, and the appraisals 164 of the website owner are shown. The browser of the website can also express their appraisals 164 to the scenic spot. The tourism agents can observe the appraisal 164 made by the browsers of the website, evaluate the scenic spot, and thereby plan a more perfect tour route.

Figure 4:
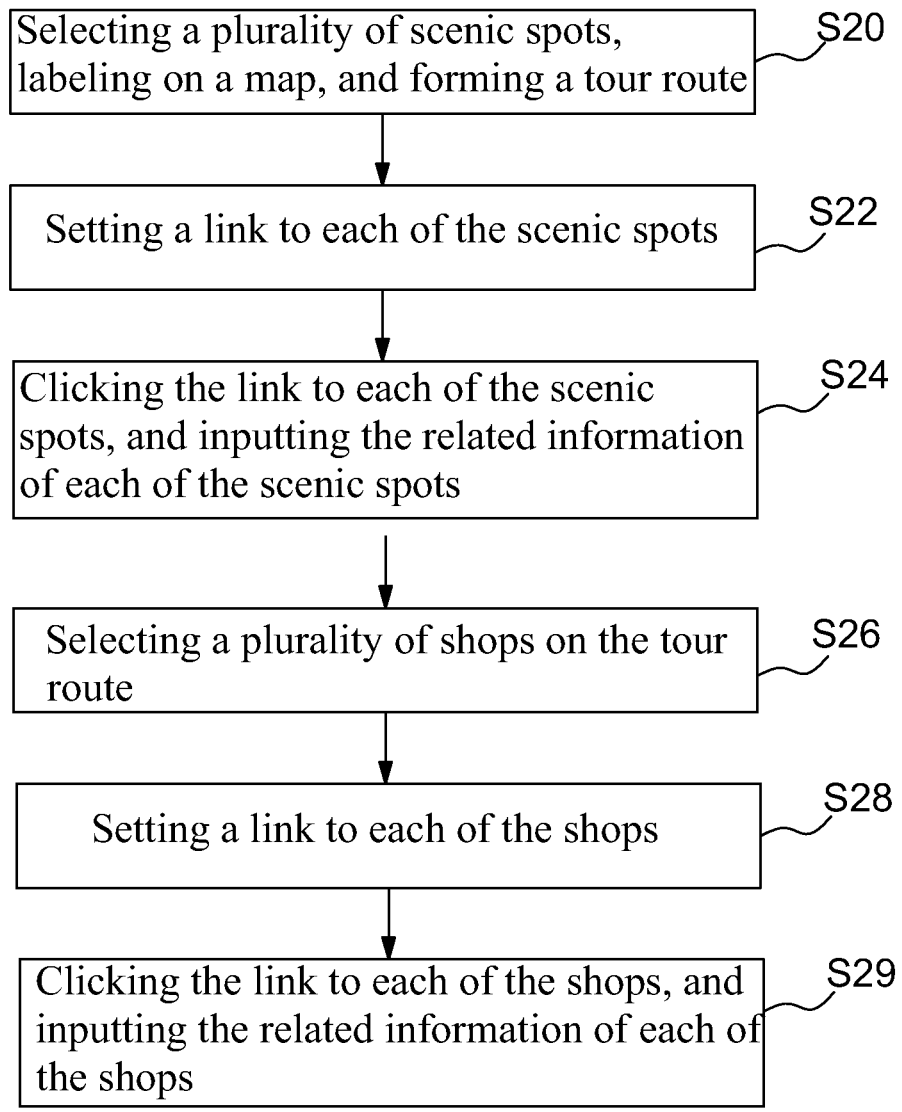
FIG. 4 shows a flowchart according to another preferred embodiment of the present invention.

FIG. 4 shows a flowchart according to another preferred embodiment of the present invention. As shown in the figure, the present invention provides a method of management for map-type tour information, which can be applied in travel websites. First, the step S20 is executed for selecting a plurality of scenic spots, labeling on a map, and forming a tour route. The method of selecting the plurality of scenic spots includes inputting a name of location, a longitude and latitude, or an address corresponding to each of the scenic spots. Alternatively, selecting directly on the map is possible. Then the step S22 is executed for setting a link to each of the scenic spots. Next, the step S24 is executed for clicking the link to each of the scenic spots, and inputting the related information of each of the scenic spots, which includes introduction, related web addresses, and appraisals corresponding to the scenic spot. Afterwards, the step S26 is further executed for selecting a plurality of shops, which are recommended by the website owner, on the tour route. The types of the shops include food, hotels, clothes, entertainment, car renting, ferries, or air flights. The method of selecting the plurality of shops includes inputting a name of shop, a longitude and latitude, or an address corresponding to each of the shops. Alternatively, selecting directly on the map is possible. Then the step S28 is executed for setting a link to each of the shops. Next, the step S29 is executed for clicking the link to each of the shops, and inputting the related information of each of the shops, which includes introduction, related web addresses, video, recording, pictures, or appraisals corresponding to the scenic spot.

Figure 5:
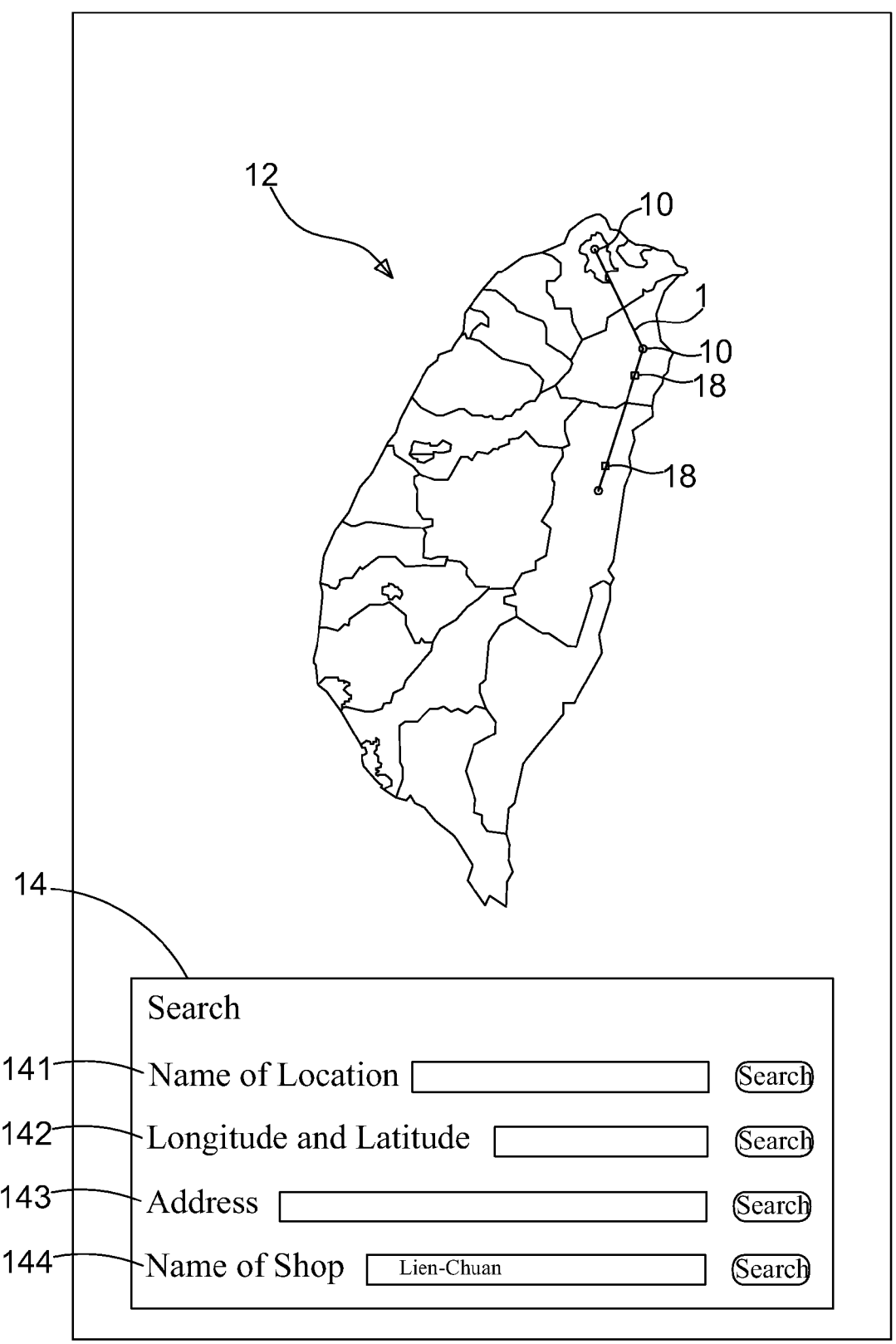
FIG. 5 shows a display schematic diagram of a webpage of a website according to another preferred embodiment of the present invention.

FIG. 5 shows a display schematic diagram of a webpage of a website according to another preferred embodiment of the present invention. As shown in the figure, the website owner label a plurality of scenic spots of each tour route, according to his own traveling experiences, on a map 12 of the webpage. For example, the plurality of scenic spots 10 of the tour route 1, from north to south sequentially, includes the Yang-Ming Mountain of Taipei, the Dong-Shan River of I-Lan, and the Ocean Park of Hua-Lien; the plurality of shops includes, from north to south sequentially, Lien-Chuan mochi and Hua-Lien Tseng's mochi. The search window 14 on the webpage can be filled with a plurality of names of location 141, longitude and latitude 142, or addresses 143 corresponding to the plurality of scenic spots 10, and be filled with a plurality of names of shops 144, longitude and latitude 142, or addresses 143 corresponding to the plurality of shops 18. Then the scenic spot 10 and the shop 18 can be searched and labeled on the map 12. Alternatively, the plurality of scenic spots 10 and the plurality of shops 18 can be selected directly on the map 12 of the webpage. Thereby, the browser of the website can refer to the tour route 1 provided and the shops 18 recommended by the website owner.

Figure 6:
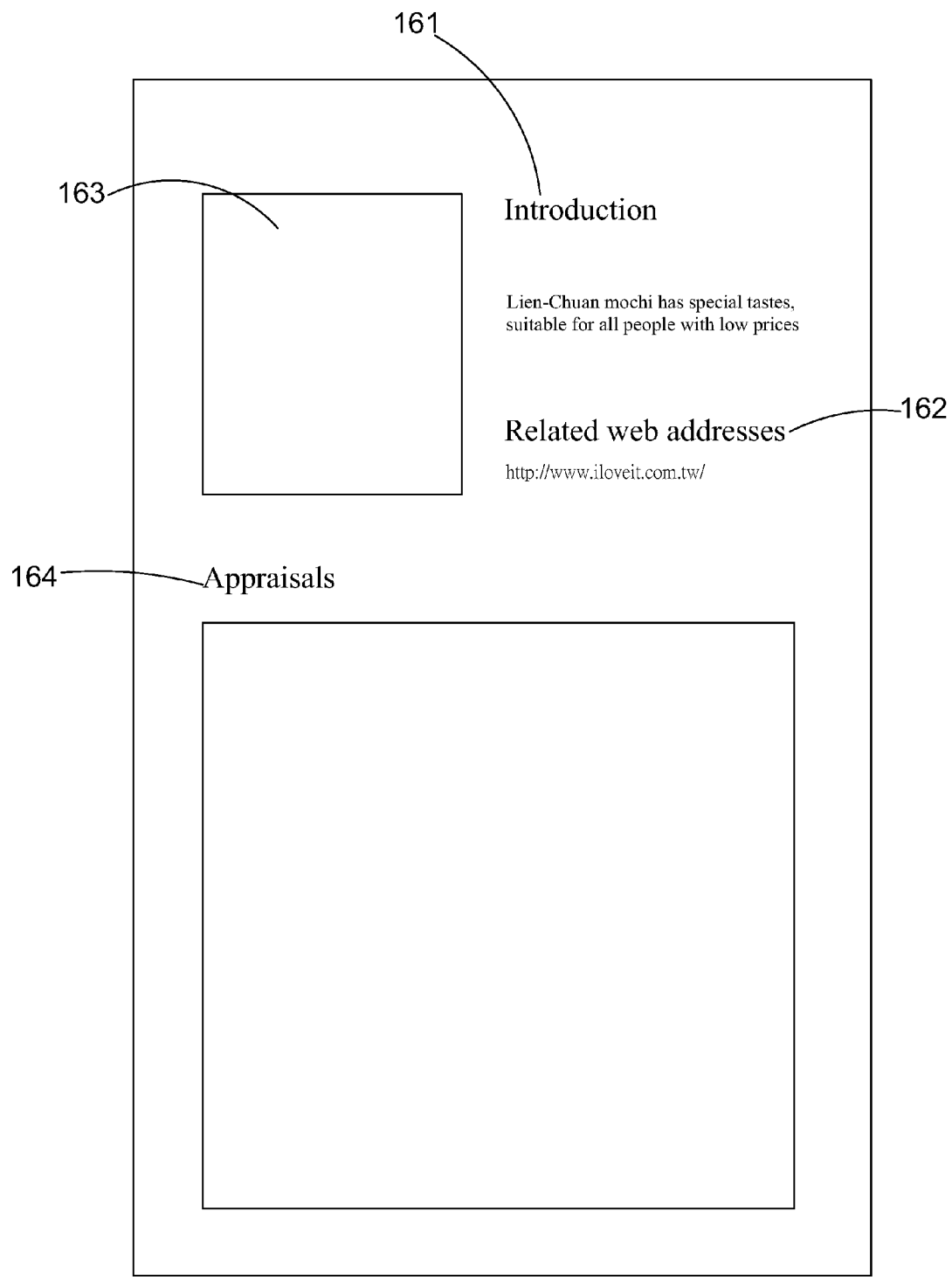
FIG. 6 shows a display schematic diagram of another webpage of a website according to another preferred embodiment of the present invention.

FIG. 6 shows a display schematic diagram of another webpage of a website according to another preferred embodiment of the present invention. As shown in the figure, links are set to each of the plurality of scenic spots and each of the plurality of shops, respectively, in every tour route 1 described above. The website owner clicks the links to each scenic spot and shop and the introduction 161, related web addresses 162, and pictures 163 of the scenic spot and the shop can be inputted, respectively. In addition, appraisals 164 to the scenic spot and the shop can be performed. The browsers of the website can refer to the appraisals 164 for planning tours of their own. They can further provide their appraisals 164 to the scenic spot and the shop with prior identify approval by the website. By clicking the link to the scenic spot, the display is shown as FIG. 3 and will not be explained further. By clicking the link to the shop Lien-Chuan mochi, the introduction 161, the related web addresses 162, and the appraisals 164 of the website owner are shown. Besides, the pictures 163 of the shop can be provided as well. In the present preferred embodiment, the pictures 163 of the shop are not shown. The browser of the website can also express their appraisals 164 to the shop. The operator of the shop can observe the appraisal 164 made by the browsers of the website and promote their products in the link. The browser of the website can also order the products of the shop directly in the link.

To sum up, the present invention provides a method of management for tour information. By using a plurality of scenic spots and a plurality of shops passed through in each trip and labeled on a map, and by clicking a plurality of links corresponding to the plurality of scenic spots and shops, the distinguishing features of the plurality of scenic spots and shops and be recorded. Thereby, tour professionals or travel-lovers can record the process of each trip, which is helpful for the planning of the next tour route. Besides, the tour professionals or travel-lovers can record their tour routes on the website. Other browsers of the website and tourism agents can thereby refer to the recorded tour routes for planning tours of their own. Furthermore, the plurality of shops are also recorded, and the operator of the shops can advertise and promote on the website.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method of management for map-type tour information, which is applied for the records of the user's traveling experience after traveling, comprising:
    selecting at least one scenic spot, displaying on a map, and forming a tour route;
    setting a World Wide Web link to each of the scenic spots;
    clicking the link to each of the scenic spots, inputting related information of each of the scenic spots according to the user's travel experience after traveling;
    the related information includes an introduction, web address, video, recording, pictures, and appraisals corresponding to the scenic spot;
    the appraisals are given by a plurality of users; and
    the users cannot give appraisals unless they are granted with identity certificates.

2. The method of management for map-type tour information of claim 1, wherein the method for selecting the scenic spots includes inputting a name of location corresponding to each of the scenic spots.

3. The method of management for map-type tour information of claim 1, wherein the method for selecting the scenic spots includes inputting a longitude and latitude corresponding to each of the scenic spots.

4. The method of management for map-type tour information of claim 1, wherein the method for selecting the scenic spots includes inputting an address corresponding to each of the scenic spots.

5. The method of management for map-type tour information of claim 1, wherein the method for selecting the scenic spots is performed on the map.

6. A method of management for map-type tour information, which is applied for the records of the user's traveling experience after traveling, comprising:
   selecting at least one shop on the tour route;
   setting a World Wide Web link to each of the shops;
   clicking the link to each of the shops, inputting related information of each of the shops according to the user's travel experience after traveling;
   the related information includes an introduction, web address, video, recording, pictures, and appraisals corresponding to the shop;
   the appraisals are given by a plurality of users; and
   the users cannot give appraisals unless they are granted with identity certificates.

7. The method of management for map-type tour information of claim 6, wherein the method for selecting the shops includes inputting a name of shop corresponding to each of the shops.

8. The method of management for map-type tour information of claim 6, wherein the method for selecting the shops includes inputting a longitude and latitude corresponding to each of the shops.

9. The method of management for map-type tour information of claim 6, wherein the method for selecting the shops includes inputting an address corresponding to each of the shops.

10. The method of management for map-type tour information of claim 6, wherein the method for selecting the shops is performed on the map.

* * * * *